(12) United States Patent
Patel et al.

(10) Patent No.: US 12,346,180 B2
(45) Date of Patent: Jul. 1, 2025

(54) MANAGING POWER IN DATA CENTERS (71) Applicant: Google LLC, Mountain View, CA (US)

(72) Inventors: Sourav Kumar Patel, San Jose, CA (US); Anand Ramesh, Sunnyvale, CA (US); Adam Christopher Forni, South Pasadena, CA (US); Krishnanjan Gubba Ravikumar, Pullman, WA (US)

(73) Assignee: Google LLC, Mountain View, CA (US)

( * ) Notice: Subject to any disclaimer, the term of this patent is extended or adjusted under 35 U.S.C. 154(b) by 17 days.

(21) Appl. No.: 17/961,257

(22) Filed: Oct. 6, 2022

(65) Prior Publication Data

US 2024/0118738 A1    Apr. 11, 2024

(51) Int. Cl.
*G06F 1/329* (2019.01)
*G06F 1/26* (2006.01)
(Continued)

(52) U.S. Cl.
CPC ............ *G06F 1/263* (2013.01); *G06F 1/3209* (2013.01); *G06F 1/329* (2013.01);
(Continued)

(58) Field of Classification Search
CPC . G06F 1/189; G06F 1/26; G06F 1/263; G06F 1/266; G06F 1/28; G06F 1/3209;
(Continued)

(56) References Cited

U.S. PATENT DOCUMENTS

| 6,574,233 | B1 * | 6/2003 | Fuller, Jr. ............... | G06F 13/38 |
| | | | | 710/305 |
| 9,158,294 | B2 | 10/2015 | Carralero et al. | |

(Continued)

OTHER PUBLICATIONS

Blog.google [online], "The Internet is 24×7. Carbon-free energy should be too" Oct. 2018, retrieved on May 9, 2023, retrieved from URL <https://www.blog.google/outreach-initiatives/sustainability/internet-24x7-carbon-free-energy-should-be-too/>, 3 pages.

(Continued)

*Primary Examiner* — Thomas J. Cleary
(74) *Attorney, Agent, or Firm* — Fish & Richardson P.C.

(57) ABSTRACT

Systems and methods for managing power loads of one or more data centers using a wide-area energy controller to operate local energy resources of the data center based on power control information generated by a remote data center control system are described. In one aspect, a system includes a set of local energy sources configured to provide power to the loads of the energy system and a wide-area energy controller. The wide-area energy controller includes a first interface communicably coupled to an application programming interface (API) that connects a remote data center control system to respective wide-area energy controllers of multiple data centers, the first interface being configured to receive power control information from the remote data center control system via the API. The wide-area energy controller includes a control unit configured to schedule the local energy sources to provide power to the loads based on the power control information.

21 Claims, 5 Drawing Sheets

(51) Int. Cl.
    *G06F 1/3209*     (2019.01)
    *G06F 13/40*     (2006.01)
    *H02J 3/00*     (2006.01)
    *H02J 3/38*     (2006.01)
    *H02J 13/00*     (2006.01)

(52) U.S. Cl.
    CPC .......... *G06F 13/4027* (2013.01); *H02J 3/003* (2020.01); *H02J 3/381* (2013.01); *H02J 13/00006* (2020.01); *H02J 2300/20* (2020.01); *H02J 2310/16* (2020.01)

(58) Field of Classification Search
    CPC ...... G06F 1/329; G06F 13/385; G06F 13/387; G06F 13/4027; Y02D 10/00; H02J 3/003; H02J 3/06; H02J 3/14; H02J 3/28; H02J 3/32; H02J 3/381; H02J 13/00001; H02J 13/00002; H02J 13/00006; H02J 13/00016; H02J 13/00022; H02J 13/00032; H02J 2203/10; H02J 2300/10; H02J 2300/20; H02J 2300/24; H02J 2300/28; H02J 2310/16; G06Q 10/04; G06Q 10/06312; G06Q 10/06315; G06Q 50/06
    See application file for complete search history.

(56) References Cited

U.S. PATENT DOCUMENTS

| | | | |
|---|---|---|---|
| 9,172,249 B2 | 10/2015 | Rockenfeller et al. | |
| 9,620,994 B2 | 4/2017 | Bhavaraju | |
| 10,474,220 B2 | 11/2019 | Pachoud et al. | |
| 11,017,130 B1 | 5/2021 | Carlson et al. | |
| 2013/0111494 A1* | 5/2013 | Hyser | G06F 9/5094 718/105 |
| 2014/0358377 A1* | 12/2014 | Hammerschmidt | G01R 31/2829 702/182 |
| 2015/0081374 A1* | 3/2015 | Sahlstrom | G06Q 10/06315 705/30 |
| 2015/0094871 A1* | 4/2015 | Bhageria | H02J 3/14 700/297 |
| 2015/0115898 A1* | 4/2015 | Yung | H02J 7/342 320/152 |
| 2016/0195910 A1* | 7/2016 | Sengoku | G06F 1/24 710/313 |
| 2017/0005515 A1* | 1/2017 | Sanders | H02J 3/388 |
| 2018/0004265 A1* | 1/2018 | James | G06F 1/266 |
| 2019/0013670 A1* | 1/2019 | Goldin | H02J 3/466 |
| 2019/0036340 A1* | 1/2019 | Meeker | H02J 3/007 |
| 2019/0373051 A1* | 12/2019 | Binotto | H04L 67/1012 |
| 2020/0006944 A1 | 1/2020 | Fife et al. | |
| 2021/0021126 A1 | 1/2021 | Hall et al. | |
| 2021/0083505 A1 | 3/2021 | Beaston | |
| 2021/0296928 A1 | 9/2021 | McNamara et al. | |
| 2021/0376613 A1 | 12/2021 | Cummings | |
| 2022/0321664 A1* | 10/2022 | Rajagopal | H02J 3/003 |

OTHER PUBLICATIONS

Extended European Search Report in European Appln. No. 23175515.8, mailed on Mar. 20, 2024, 10 pages.
Extended European Search Report in European Appln. No. 23175515.8, mailed on Mar. 28, 2024, 11 pages.

* cited by examiner

MANAGING POWER IN DATA CENTERS

TECHNICAL FIELD

This disclosure generally relates to power management and wide-area energy control systems.

BACKGROUND

A data center typically includes a large number of networked computers, storage systems, networking equipment, cooling systems, and various other components for ensuring that the computers operate appropriately. Many data centers can host mission critical applications that should not be shut down. Thus, many data centers include backup power systems, which typically include some combination of Uninterruptible Power Supplies (UPSs) and backup generators.

SUMMARY

In general, this document describes a wide-area energy control system (e.g., which can be implemented as a microgrid controller) that handles local control of diverse energy sources at a facility, such as a data center. The wide-area energy control system adjusts the local control of energy sources based on power control information received from a remote data center control system. The wide-area energy control system generates commands based on the power control information, and utilizes an agnostic communication interface to transmit the commands to the various energy sources at the facility. The agnostic interface allows the wide-area energy control system to connect to the communication interfaces of the diverse energy sources. A control system of each energy system can include a communication interface configured to communicate with the agnostic interface of the wide-area energy control system, allowing for a plug and play architecture in which energy sources can be easily connected and disconnected to the wide-area energy control system.

In general, one innovative aspect of the subject matter described in this specification can be embodied in systems that include a set of local energy sources configured to provide power to the loads of a data center; a wide-area energy controller that includes a first interface communicably coupled to an application programming interface (API) that connects a remote data center control system to respective wide-area energy controllers of multiple data centers, the first interface being configured to receive power control information from the remote data center control system via the API; a control unit configured to schedule the local energy sources to provide power to the loads based on the received power control information; and a second interface communicably coupled to each a local controller of each local energy source in the set of local energy sources, wherein the control unit sends control information to the local energy systems via the second interface. Other embodiments of this aspect include corresponding apparatus, methods, and computer programs, configured to perform the actions of the methods, encoded on computer storage devices.

These and other implementations can each optionally include one or more of the following features. In some aspects, the local energy sources of the system include at least two or more different types of energy sources. The local energy sources can include two or more of (i) a diesel generator, (ii) a solar energy source, (iii) a wind energy source, or (iv) a battery energy source. The loads can include multiple data center computers and networking equipment. The power control information includes a schedule of computing tasks to be performed by the data center computers. In some aspects, the power control information includes expected power demands of computing tasks to be performed by the data center computers.

In some aspects, the remote data center control system schedules computing tasks for each data center. The schedule of computing tasks computed for each data center can be determined by a schedule optimization engine, and the schedule optimization engine can apply historical data and software services to improve the schedule. The system includes the first interface of the wide-energy controller that is agnostic to the remote data control center. The system includes the second interface of the wide-area energy controller that is agnostic to the corresponding local controller of the local energy source in the one or more data centers.

Integration of diverse energy sources into data centers is challenging given differing electrical properties of energy sources (e.g., different inertial mass, response times, system dynamics, reactive power capabilities) and the differing information technology (IT)/cooling loads (e.g., thermal RC constants, classes of IT loads). In addition, it is challenging to coordinate low level (e.g., machine-level controls) with high-level optimal dispatch algorithms that may not even be located at the data center. For example, absent the control system hierarchy, communication interfaces, and control techniques described in this document, energy sources would be required to communicated with each other to coordinate power delivery to loads, which is complicated and the lack of a standard agnostic interfaces further complicates the control.

Particular embodiments of the subject matter described in this specification can be implemented so as to realize one or more of the following advantages. Wide-area energy control systems described in this document are configured to transmit and execute commands in real time or near-real time, e.g., within seconds or milliseconds, to control local energy sources based on software workload scheduling, e.g., based on the schedule of software tasks performed by servers in a data center, which schedule may be controlled by a remote data center control system. The wide-area energy control system also integrates diverse energy sources using a vendor-agnostic interface that allows for easier and faster installation of energy sources of practically any type (e.g., solar panels, wind turbines, gas generators, etc.) and faster integration of the energy sources with the control system, regardless of the vendor. The wide-area energy control system communicates control commands for local control using the vendor-agnostic interface, compared to creating and controlling multiple vendor-specific interfaces to operate the diverse energy sources. Connecting to and using multiple different vendor-specific interfaces for different energy sources requires complex wiring networks and generates increased latency between programming and execution of control at the energy source. The vendor agnostic interface leveraged by the wide-area energy control system allows for simpler connections and lower latency compared to these other techniques.

An application programming interface (API) accessible by the remote data center control system can provide access to weather information, electric grid status, and other third party information that can be used to schedule workloads, e.g., software tasks, across data centers based on the availability of energy sources at each data center. For example, the API can monitor for updated weather data and transmit the weather data to the wide-area energy control system, in which the wide-area energy control system implements robust feedback and optimized utilization of energy sources. The API, which is also accessible by the remote data center control system, provides additional security compared to solely relying on security protocols for each individual energy source in a data center environment. The API serves as a security air-gap isolating either the data center or the remote data center control system from the other, to protect networking equipment.

An advantage of the wide-area energy control system is the integration with the received weather data from the API to shift workload schedules of energy sources, e.g., ramp-up solar battery asset charging during ideal weather conditions and transfer workloads to other data centers when there are inadequate weather conditions. Shifting workload schedules of energy sources in a data center allows for more reliable service, more uptime for software workloads, and the selection and use of more efficient and/or more environmental friendly energy sources available at different data centers. The wide-area energy control system can also utilize electric grid status from the API to ramp-up backup energy sources during routine maintenance of the grid and ensures resilient operation of the data center during grid outages. An additional advantage of the wide-area energy control system is the ability to aggregate energy and load resources to help provide services to an electric grid or utility, without dispatching and independently coordinating each diverse energy source locally.

By aggregating energy and load resources, the wide-area energy control system is able to control (e.g., shape) data center workloads (e.g., assigned software tasks to be performed at the data center) based on a forecast of carbon-intensive energy consumption from an electric grid. The wide-area energy control system is able to shift utilization of diverse energy resources from carbon-intensive to carbon-free by any capacity, and to reduce the carbon footprint (e.g., carbon emissions) of the data center. An additional advantage of the wide-area energy control system is the ability to command carbon-free distributed energy resources by their respective controllers, to increase power generation during a period of high carbon-intensity for the electric grid. The wide-area energy control system can shift execution of electric loads to occur during time periods with lower carbon-intensity (fewer carbon emissions), instead of a period of high carbon-intensity for the electric grid.

The details of one or more implementations of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

To describe technical solutions in the implementations of the present specification or in the existing technology more clearly, the following briefly describes the accompanying drawings needed for describing the implementations or the existing technology. The accompanying drawings in the following descriptions merely show some implementations of the present specification, and a person of ordinary skill in the art can still derive other drawings from these accompanying drawings without creative efforts.

Like reference numbers and designations in the various drawings indicate like elements.

DETAILED DESCRIPTION

This disclosure describes control systems for managing the power to loads of a data center using a wide-area energy control system (e.g., a microgrid controller) that provides an interface between a remote controller and the individual controllers of distributed energy resources (DERs) that are configured to provide power to the loads. To help a person skilled in the art better understand the technical solutions in the present specification, the following clearly and comprehensively describes the technical solutions in the implementations of the present specification with reference to the accompanying drawings in the implementations of the present specification. The described implementations are merely some rather than all of the implementations of the present specification. All other implementations obtained by a person of ordinary skill in the art based on one or more implementations of the present specification without creative efforts shall fall within the protection scope of the implementations of the present specification.

Figure 1A:
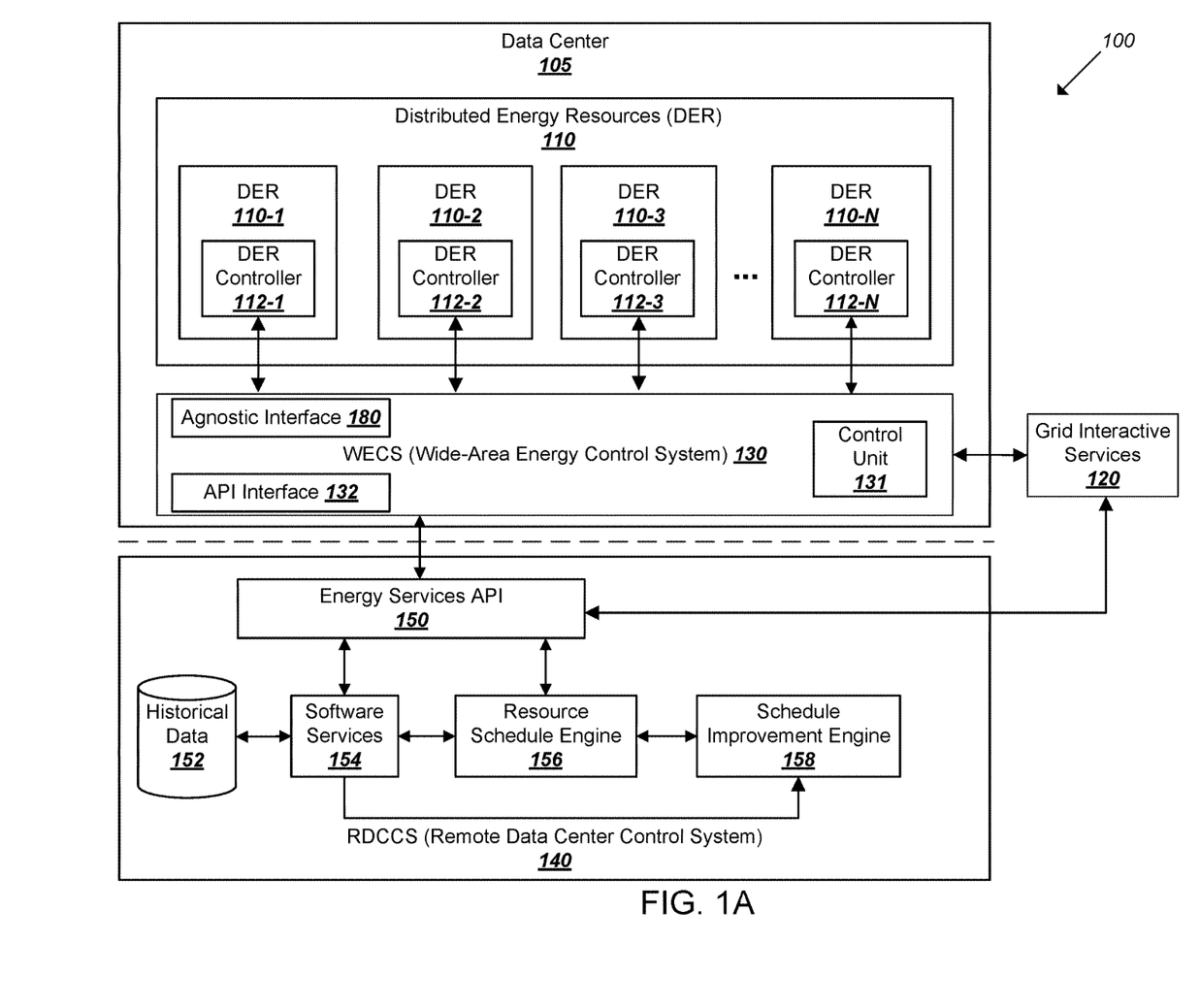
FIG. 1A depicts an example data center environment in which a wide-area energy control system manages power for loads of a data center.

FIG. 1A depicts an example data center environment 100. The illustrated data center environment 100 includes a data center 105 connected to a remote data center control system (RDCCS) 140, with grid interactive services 120 available. The data center 105 is supplied electricity (e.g., three-phase alternating current (AC) voltage at various voltages e.g., 230 V or 480V and at various frequencies e.g., 50 Hz or 60 Hz) by an electric utility grid (not illustrated) but may operate in a different modes further described with reference to FIG. 4.

In general, the data center 105 can include various types of computing components, such as computers (e.g., racks and/or cabinets of servers) and telecommunication and storage equipment to support network and storage infrastructure. Network infrastructure includes networking equipment, e.g., routers, switches, firewalls for wired and wireless communication devices. Storage infrastructure includes equipment (e.g., hard disk drives, solid-state drives, and storage/backup management utilities) to support data processes (e.g., store, retrieve, distribute, back up, or archive data).

The data center 105 can use electricity from an offsite electric source (e.g., network electric grid and/or co-located energy resources) for multiple electrical loads, including the computing components, power subsystems, ventilation, cooling systems, fire suppression, backup generators, etc. The data center 105 also includes various electrical loads to support operations such as network security, application delivery assurance, network and storage infrastructure, etc. In general, the data center 105 can be configured to support, e.g., host, software workloads using data, software applications, and/or servers (e.g., storing, processing, transmitting, receiving) across different fields (e.g., information technology, healthcare, banking, web services).

The data center 105 includes multiple distributed energy resources (DERs) 110 that are also configured to provide energy for powering loads of the data center 105. The DERs 110 can provide backup power to the loads, e.g., in the event of grid failure, and/or be used as the primary power source for the loads or a supplement to grid power (e.g., such that some loads are powered by the grid while others are powered by the DERs 110). For example, it may be more efficient to use a DER 110 in place of a utility grid during some time periods, while being more efficient to use the grid during other time periods. Having the DERs 110 electrically coupled to the power bus for the data center 105 provides flexibility in energy sources while also preventing downtime in the case of grid failure. Although not shown, the grid and each DER 110 can be electrically coupled to a primary power bus for the data center 105. In some cases, the DERs 110 can also provide power to the grid.

Each individual DER 110-1 through-110-N has a corresponding DER controller 112-1A through 112-N and respective interfaces (not shown in FIG. 1A). In this example, the data center has a number "N" of DERs 110, where N is at least two. Each corresponding DER controller 112-1 through 112-N configures the respective DER 110-1-through 110-N by regulating the operating conditions and also obtains status information for the corresponding DER 110. For example, a DER controller 112 of a DER 110 can perform start up functions for the DER 110, regulate the output voltage and/or current of the DER 110, shut down the DER 110, and perform other functions associated with controlling a DER 110.

In some implementations, a DER controllers 112 can be implemented as a control panel connected to sensors throughout the respective DER 110. For example, a diesel generator (e.g., at least one DER of the DERs 110-1 through 110-N) includes a generator control panel. The generator control panel can include a control module (e.g., programmable logic controller) that is configured to start/stop the engine, monitor generator protections, and/or enable local circuit breakers in event of operation failure. In another example, the DER controller 112 of a solar panel includes a solar charge controller to prevent the battery asset of a solar panel from overcharging by regulating voltage and current. In another example, the DER controller 112 of a wind turbine performs continuous fault monitoring, emergency shutdown, pitch and torque control for the wind turbine. The DER controller 112 of the wind turbine adjusts pitch and/or torque, in conjunction with a speed sensor to optimize energy captured from various wind directions to generate electricity. The DER controllers 112-1 through 112-N can use various types of control techniques, such as feedback control (e.g., proportional, proportional-integral-derivative (PID), etc.) or other appropriate control techniques.

The DERs 110 can include a wide variety of carbon-free energy sources (e.g., wind turbines, photovoltaic panels, fuel cells, battery and other energy storage systems, and/or other carbon-free resources) and/or fossil fuel energy sources (e.g., diesel generators, coal-fired plants, natural gas generators, and/or other non-renewable resources). Some examples of energy sources of DERs 110 also include generators (e.g., fuel cells, linear generators, internal combustion engine, nuclear power plants, geothermal power plants, carbon capture and storage devices) and energy storage devices (e.g., lithium ion batteries, ultra-capacitors, molten salt, flow batteries, adiabatic compressed Air, liquid air, thermal energy storage, and gravity storage).

For example, the data center 105 can be selectively powered by a combination of a utility grid, diesel generators, and one or more renewable energy sources including solar panels, wind turbines, etc. Due to the inherent differences in producing power using carbon-free and fossil fuel energy sources, the respective operating parameters and conditions can vary from DER 110-1 through DER 110-N. In some implementations, carbon-free energy sources of the DERs 110 gathered through renewable technologies (e.g., photovoltaic panels) are stored in battery systems as direct current (DC), which can be converted to alternating current (AC) by an electric inverter. In other implementations, carbon-free energy sources of the DERs 110 gathered through renewable technologies (e.g., wind turbines) are configured to output AC power. The DER controllers 112a-112n will execute commands using the appropriate operating parameters based on the type of energy source for the respective DER 110-1 through 110-N.

In some implementations, the carbon-free resources of DERs 110-1 through 110-N can be dispatched (e.g., installed at the data center 105) in addition to, or instead of, the carbon-based generators (e.g., diesel generators) to reduce carbon intensity (e.g., carbon emissions) of the data center 105. For example, all of the DERs 110-1 through-110-N for the data center 105 can be carbon-free energy sources. In another example, the carbon-free resources of DERs 110-1 through 110-N can be dispatched to provide carbon-free generated energy to an electric grid, to reduce the overall carbon intensity of the electric grid. For example, if the DERs 110-1 through 110-N are capable of producing more energy than the data center 105 is currently consuming, the DERs 110-1-110-N can output power to the utility grid.

Additionally, the DER controllers 112-1 through 112-N typically include various types of vendor-specific interfaces to configure and operate the corresponding DER 110-1 through 110-N. In some examples, the DERs 110 can include the same or similar types of energy sources having the same interface, but can operate with different parameters based on the respective load of the data center 105. For example, the DERs 110 of the data center 105 may include a group of batteries that have a common interface or multiple groups of batteries each having the same type of interface.

The RDCCS 140 remotely identifies and determines high-level operation parameters for the data center environment (e.g., peak load demands, power service schedules, electric load configurations). For example, the RDCCS 140 determines electric load demands for the data center 105 operations and/or determines a configuration of DERs to meet the electric load demands. The RDCCS 140 can determine the configuration based on electric utility grid status and current data center 105 operation status, and transmit power control information that includes the desired configuration to a wide-area energy control system (WECS) 130.

In a particular example, the RDCCS 140 can manage the software workloads of the data center 105 and optionally other data centers are well. The RDCCS 140 can assign software workloads to the data center 105 and transfer software workloads between data centers based on various factors, such as the availability of carbon-free or lower carbon producing energy sources at the data centers, to balance loads among data centers, to process workloads in geographic locations that are closest to where input and/or output data is received or sent, and/or other appropriate factors.

The RDCCS 140 can also determine, or at least estimate, the amount of power the data center 105 will consume to process the workloads, e.g., over the course of one or more time periods. The RDCCS 140 can determine the amount of power based on the computational power (e.g., the number of computers) that will be used to process the workloads, the duration of the workloads, the amount of power consumed by computers and other components of the data center 105, and/or other appropriate factors.

In some implementations, the RDCCS 140 sends, as the power control information, to the wide-area control system 130, the determined amount of power for each time period. In this example, the wide-area control system 130 can select one or more energy sources to provide the power, e.g., from the grid and DERs 110-1 through 110-*n*, and the amount of the power that each source is to provide. In some implementations, the RDCCS 140 selects the one or more energy sources and provides the selected configuration as part of the power control information. The configuration data that defines the configuration of the energy sources for the load, whether determined by the RDCSS 140 or the WECS 130, can indicate the amount of power to be provided to the loads of the data center 105 (e.g., to the power bus for the loads) by each energy source and optionally the time period for each power level for each energy source.

The component (e.g., RDCCS 140 or WECS 130) of the data center environment 105 that determines the configuration of the energy sources for the loads of the data center 105 can select the energy sources based on one or more objectives and/or factors. For example, one objective is to reduce the carbon emissions of the data center 105 and/or other data centers. In this example, the component can select, from the grid and DERS 110, energy sources that emit the least amount of carbon (e.g., in ranked order), until sufficient power for powering the loads is selected. In some cases, the carbon level of the grid can vary depending on the energy sources providing power to the grid. In such examples, the component can receive carbon emission data (e.g., in the terms of a level such as carbon-intensive or reduce carbon, or in terms of an amount per unit time) from grid interactive services, as described below.

Another objective may be to use grid power unless additional power or backup power is needed. In this example, the component can select the energy sources by first selecting the grid and then selecting DERs 110 based on other objectives, e.g., reducing carbon emissions. Another objective may be to use the grid only when necessary. In this example, the component can select the DERs 110 first based on other objectives and select the grid last if additional power is required to power the loads.

The WECS 130 is configured to determine control information for adjusting operating parameters (e.g., frequency bias, power and frequency deviation, power generation) of the DER controllers 112-1 through 112-N of the DERs 110-1 through 110-N. The WECS 130 can determine the control information for each DER controller 112 based on the selected configuration of energy sources for the data center 105 on an ongoing basis or whenever the configuration changes. For example, the WECS 130 can receive configuration data from the RDCCS 140, obtain the power level for each DER 110 from the configuration data, and determine the control information for each DER 110 based on the power levels, time periods for each power level etc. As part of this control, the WECS 130 can coordinate when each DER 110 is started and synchronize the DERs 110 (e.g., synchronize phase, voltage levels, current levels, etc.) by sending control information to the DER controllers 112. The WECS 130 includes a control unit 131 that determines the control information for each DER 110 and sends the control information to the DER controller 112 of each DER 110 by way of an agnostic communication interface 180, which is also referred to as agnostic interface 180 for brevity. The control unit 131 can include one or more hardware processors, controllers, microcontrollers, and/or other appropriate processing hardware capable of executing instructions to determine control information.

The RDCCS 140 remotely communicates with the WECS 130 through an energy services application programming interface (API) 150. The WECS includes an API interface 132, which can also be referred to as a first communication interface, that is communicable coupled to the energy services API 150. The API interface 132 can include hardware and/or software that is capable of generating API calls to the energy services API 150 and receiving information from the RDCCS 140 through API calls initiated by the RDCCS 140.

In some implementations, the RDCCS 140 is co-located with the data center 105. In some implementations, the RDCCS 140 is communicably coupled to multiple data centers (e.g., data center 105 and one or more other data centers) that may be located in different geographic regions When the RDCCS 140 is configured to access multiple data centers, the RDCCS 140 controls workloads (e.g., software tasks) performed by each data center and performs operations including load-shifting, load ramp-up, load ramp-down, and/or other appropriate operations for each data center. For example, the RDCCS 140 communicably coupled to two or more data centers can shift the loads from a first data center to a second data center by enabling more servers at the second data center, transmitting power control information to each data center based on the adjusted workloads at each data center, and transferring the workloads between the data centers. In the case of load shifting, the RDCCS 140 is configured to determine a ramp-up schedule for the DERs 110 of the second data center to ensure that the DERs 110 are providing sufficient power when the workloads are transferred and ramp-down schedule for the DERs 110 of another data center so that energy is not being wasted by having DERs 110 run unnecessarily.

In some examples, the RDCCS 140 is configured to share operational loads between data centers depending on electric load demand and the availability of power (or the availability of carbon-free power) at the data centers. For example, if there is insufficient power at a data center to power the equipment to process the currently assigned workloads, the RDCCS 140 can transfer some of the workloads to another data center that has capacity for processing the workload and sufficient available power to power the equipment to process the additional workloads. In another example, the carbon-free energy sources of one data center may not be able to produce sufficient power based on the weather, e.g., solar panels cannot produce power due to cloudy or night conditions. To reduce carbon emissions, the RDCCS 140 can transfer loads from the data center to another data center that has carbon-free energy capacity.

The RDCCS 140 performs and in some examples, provides software services 154 to end-users of a software product and in some implementations, the end-users of a hardware product. The software services 154 include applications to an end-user, allowing the end-user to run, display, access, or interact with software through a network (e.g., wireless or wired) connection. In some implementations, software services 154 include sharing navigation directions, providing storage and computation resources, translating languages, transmitting and receiving electronic correspondence. In some implementations, the software services 154 include providing access to licensed content (e.g., movies, television shows, applications) and providing platforms for web servers, operating systems, or other types of infrastructure. As an example, the software services 154 include security and monitoring applications (e.g., firewall protection, network health monitoring) to service the data center environment 100, or multiple data centers. Software services 154 can include various types of cloud-based software solutions such as software as a service (SaaS), platform as a service (Paas), and so on.

The RDCCS 140 is configured to determine power control information of the data center 105 to successfully execute the software services 154 being processed by the data center 105. The RDCCS 140 can compute the electric load and schedule for performing the software services 154 assigned to the data center 105 using the information about the data center 105, the DERs 110, electric utility grid information, and/or other appropriate factors. For example, the execution of software services 154 may involve a significant total load (e.g., 20 MW per day) which can be provided by an electric utility grid and in some examples, one or more of the DERs 110-1 through 110-N. The RDCCS 140 calculates the total load for operating the data center 105 and the distribution of electric load for data center environment 100 functions (e.g., cooling, executing software services, heating, and security). The power control information calculated by the RDCCS 140 includes, for example, voltage and frequency requirements for electric loads, transmission and distribution data within the data center 105, and scheduling requirements for forecasted electric usage. The grid interactive services 120 (further described below) directly provides additional external information to the RDCCS 140 (e.g., electric utility grid status, weather patterns, carbon emissions data), while the WECS 130 provides status information about the data center 105 to the RDCCS 140 through the energy services API 150. The RDCCS 140 also tracks power flows throughout the data center environment 100, monitors transactions between electricity suppliers and utilities, and determines frequency and voltage requirements for electric loads.

The RDCCS 140 hosts historical data 152, which can be accessed by the software services 154 to perform tasks (e.g., store additional data, execute computations, fulfill communications, etc.). The historical data 152 is stored on virtual or physical storage devices (e.g., virtual compute servers, physical storage servers, etc.) but can include data describing trends, analytics, and inferences about software services 154 to inform data center 105 operations. The historical data 154 received by software services 154 be standardized into an accessible format from a variety of applications. For example, the historical data 154 includes satellite images, camera images, and video data received through the software services 154 to enhance navigation applications utilized by an end-user. The historical data 154 also includes language databases accessed by the software services 154 to improve language translations provided to an end-user. In some implementations, the historical data 154 includes inferences from analyzed data determined through software services 154, in which the inferences describe relationships in the data for faster processing in future executions of the software services 154.

The RDCCS 140 transmits power control information to the WECS 130 to fulfill the software services 154 based on a resource schedule engine 156 and a schedule improvement engine 158. The resource schedule engine 156 performs processes to prioritize the software services 154 in the data center environment 100 and optionally other data center environments that include other data centers. For example, the RDCCS 140 identifies various tasks to perform and fulfill the software services 154 but can only execute tasks based on load availability of the DERs 100 in the data center 105. The resource schedule engine 156 determines costs (e.g., computation time, peak load usage, load duration, etc.) to identify the priority of the received tasks. In some implementations, the resource schedule engine 156 determines a fulfillment schedule for multiple data centers managed by the RDCCS 140 to meet software service demands across the multiple data centers. In some examples, the resource schedule 156 identifies load management techniques (e.g., load-shedding, load-balancing) between one or more data centers controlled by the RDCCS 140, based on the information received from the respective WECS or grid interactive services.

The schedule improvement engine 158 is configured to receive data from the resource schedule 156 and the software services 154 to improve the ability of the resource schedule engine 156 to allocate costs and priorities for received tasks. The schedule improvement engine 158 receives scheduling information from the resource schedule engine 156 and identifies any gaps in electricity production that can be covered by enabling one or more additional DERs of the DERs 110. Once the additional DERs 110 are identified, the schedule improvement engine 158 updates the resource schedule engine 156 to incorporate the identified changes in the energy source configuration.

In some implementations, the software services 154 of the RDCCS 140 connect to the schedule improvement engine 158 to transmit information from the historical data 152. For example, the historical data 152 contains trend and inference data from the usage of software services 152 to identify peak usage times and applications of the software services. The provided trend and inference data from the historical data 152 allows the schedule improvement engine 158 to identify preferred operation times for the data center 105, in which the data center 105 operations can shift schedules to avoid concurrence with peak electric grid usage or concurrence when carbon-based DERs are less capable of producing power for the data center 105 (e.g., at night for solar panels). In some implementations, the schedule improvement engine 158 identifies a preferred electric load schedule and usage based on task intensity (e.g., time-intensive vs. non-time intensive tasks) and priority from the historical data 152. In another example, the schedule improvement engine 158 identifies improvements to the schedule based on information from grid interactive services 120 received through the energy services API 150. The energy services API 150 provides electricity cost information from the electric utility provider, and the schedule improvement engine 158 identifies periods of high cost electricity. The schedule improvement engine 158 determines one or more DERs 110 to be enabled and produce electricity for a lower cost than the electric utility provider without negatively impacting the operation of the data center environment 100 (e.g., in performing software services 154).

In the illustrated implementation, the RDCCS 140 is configured to use an energy services API 150 to interact with the data center 105 and identifies the appropriate load demands to execute multiple software services 154. The energy services API 150 is configured to connect to the WECS 130 of the data center environment 100 to transmit commands from the RDCCS 140 to the data center 105.

An example WECS 130 e.g., which can be implemented as a microgrid controller, generates status information for electrical loads of assets utilized by the data center 105 (e.g., servers, application-delivery controllers, firewalls, etc.) including power and cooling equipment requirements to maintain data center 105 operability. For example, the data center 105 requirements can include servicing cooling systems (e.g., direct expansion, direct-to-chip, hot/cold aisle arrangement, etc.), servicing critical loads (e.g., servers, routers, computers, storage devices, etc.), charging uninterruptible power supply (UPS) systems, and/or maintaining lighting systems.

The WECS 130 can monitor the status of DERs 110 (e.g., based on information received from the DER controllers 112) and the status of the loads (e.g., computing equipment, cooling equipment, etc.) and provide the status information to the RDCCS 140 via the energy services API 150. The status of the DERs 110 can include, for example, whether the DER 110 is actively producing power, how much power is being produced, the characteristics of the output power (e.g., voltage level, current level, phase, frequency, etc.), the current capacity to produce power (e.g., which can vary based on weather conditions for solar and wind sources or the amount of use for battery sources), and/or other appropriate information. The RDCCS 140 uses this status information to assign workloads to the data center 105 (or to other data centers) and to select the energy source configuration for the data center 105.

In some cases, the RDCCS 140 can aggregate the status information (e.g., the available capacity) for the DERs 110 at the data center 105 and use the aggregated information in making workload and energy source configurations. For example, the RDCCS 140 can evaluate the aggregated information to determine that the capacity is low and shift some software workloads to another data center that has more capacity to power additional loads.

The WECS 130 includes agnostic interface 180 for communicating with and synchronizing multiple control systems (e.g., the DER controllers 112-1 through 112-N) to execute microgrid services (e.g., ramping up or down electric loads, sharing electric loads, dynamic weather impact and tracking, etc.). The agnostic interface 180, which can be referred to as a second interface of the WECS 130, can be implemented as a standard interface that enables the WECS 130 to communicate with the DER controller 112 of each DER 110. The agnostic interface 180 can use an industry standard protocol such that the WECS 130 does not have to be configured to communicate using multiple different vendor-specific interfaces for multiple different energy source vendors. Instead, each DER controller 112 and the WECS 130 can include the agnostic interface that enables communication using the standard protocol.

The WECS 130 can also monitor weather patterns (e.g., long periods of direct sunlight, strong wind storms, etc.) affecting the data center environment 100 to determine impact on the DERs 110, in which the WECS 130 adjusts electric loads based on the weather pattern. In an example, the WECS 130 is configured to use information about the weather, electric utility grid status, and data center 105 status to simultaneously and in near-real time, control the DER controllers 112a-112n, thereby controlling the DER resources 110-1 through 110-N. For example, the WECS 130 is configured to utilize backup resources (e.g., battery assets, diesel generators) in the event of an electric grid failure (e.g., blackout event 403b or 405a referring to FIG. 4). If some or all of the DERs 110 (e.g., DER 110-1 through 110-N) are carbon-free energy sources (e.g., renewable resources), the WECS 130 is configured to utilize the renewable resources to power the data center 105 and reduce overall carbon output (e.g., compared to diesel generators).

In another example, the WECS 130 adjusts dependencies on photovoltaic panels (e.g., a DER 110-1 through-110-N) if the weather provides substantially direct sunlight (e.g., to charge battery assets connected to the photovoltaic panels). The WECS 130 coordinates the power control information from the RDCCS through an example API to provide commands to the DER controller 112-1 through 112-N of the respective DER 110-1 through 110-N. In some implementations, the WECS 130 receives commands from the RDCCS 140 to increase or decrease electric loads for cooling the data center 105 in the data center environment 100 depending on identified conditions from the RDCCS 140. The WECS 130 efficiently identifies and allocates load demands for the data center 105 by adjusting the operation parameters of DERs 110 of the data center 105, using information from multiple grid interactive services 120 and the desired load schedule and power generation identified by the RDCCS 140.

The grid interactive services 120 are available to the WECS 130 and RDCCS 140 to provide additional third party information about the data center environment 100, the corresponding electric grid, and/or other environment data. The grid interactive services 120 are directly transmitted to the WECS 130 (e.g., for latency-sensitive services) or through the energy services API 150 for the RDCCS 140. For example, the grid interactive services 120 includes information about grid operations, electric utility costs, electric utility planned maintenance and outages, and weather monitoring/alerts. The WECS 140 and RDCCS 140 are configured to receive information from grid interactive services 120 in real-time or near-real time.

In some cases, the DERs 110 can create a surplus of electric energy, in which upon receipt of a command from the WECS 130, is applied to a connected electric grid from the electric utility. In another example, the WECS 130 receives power control information from the RDCCS 140 related to shifting load schedules to reduce costs during peak electric grid usage (e.g., operating the data center 105 when the electric utility prices per kWh is more affordable). The WECS 130 is configured to receive commands from the RDCCS 140 and augment the capacity of DERs 110 in the data center environment 100. For example, the WECS 130 is configured to efficiently allocate the usage of standby power systems (e.g., batteries) when a power outage is detected. The WECS 130 determines appropriate usage between a standby power system and an uninterruptible power system depending on if the event is a planned (e.g., maintenance) or unplanned (e.g., power grid blackout).

In another example, the WECS 130 is configured to incorporate weather alerts and data pertaining to the operation of data centers connected to the RDCCS 140. The WECS 130 is configured to receive a weather alert and appropriately communicate with the RDCCS 140 to coordinate a response in the data center 105. For example, if the data center environment 100 is forecasted to undergo severe thunderstorms, the RDCCS 140 determines power control information to reduce load generation of one or more affected DERs 110 (e.g., wind turbines, photovoltaic panels) and increase the load generator of one or more unaffected (e.g., backup) DERs 110 (e.g., diesel generators). The RDCCS 140 can also use such information to shift loads from the data center 105 to another data center, e.g., to use carbon-free energy sources at the other data center instead of the grid at the data center 105 and/or to prevent downtime for the workloads being processed at the data center 105.

Upon receipt of the power control information from the RDCCS 140, the WECS 130 generates control information for the respective DERs 110 and transmits the control information to the DER controllers 112 of the DERs 110, e.g., using the agnostic interface 180. The control information can include information that instructs the DER controller 112 on how to operate the DER 110. For example, the control information can include commands to ramp-up (e.g., increase voltages) of the DER 110 ramp-down (e.g., reduce voltages) of the DER 110. In another example, the control information can include the target output voltage for the DER 110, the target output current for the DER 110, the target frequency and phase of the output voltage of the DER 110, a time at which the DER 110 should be at the targets, and/or other appropriate information to control the output of the DER 110. The DER controllers 112 can use the control information to control the DER 110 to output power according to the control information.

As different energy sources produce power for the power bus in different ways and have different ramp up and ramp down times, the WECS 130 can generate control information for each DER 110 based on the characteristics of the DER 110. For example, if a DER 110 has a higher ramp up time, the control information for that DER 110 may have an earlier time to start ramping. In another example, the DER controller 112 can be configured to convert control information to control signals for the components of its DER 110. For example, the control information can include a time that the target output voltage should be ready. In this example, the DER controller 112 can determine an appropriate ramp up time for the DER 110.

The WECS 130 generates the control information using synchronization techniques. For example, the WECS 130 can ramp up the DERs 110 in a sequence and control various circuit breakers of the data center 105 to ensure that the outputs of the DERs 110 are electrically coupled to the power bus properly to avoid current surges and other negative impacts to the power bus or grid. For example, each DER controller 112 can provide status information to the WECS 130 by way of the agnostic interface 180. The status information can include the characteristics of its output power (e.g., the voltage, current, phase, frequency, etc.) The WECS 130 can use this status information to determine when to electrically couple the output of each DER 110 to the power bus.

In some implementations, the RDCCS 140 is connected to multiple data centers (e.g., in a single data center environment, across multiple data center environments) and upon receipt of emergency weather warnings, the RDCCS 140 is configured to reduce loads from an affected data center while increasing the loads for unaffected data center to ensure reliable data center operation.

In another example utilizing grid interactive services 120, the WECS 130 is configured to incorporate the effective cooling rate of a data center (e.g., due to geographical location of the data center) and determine if the data center should transfer electric loads to another example data center with more amenable cooling efficiencies. Transferring electric loads can include transferring software workloads that use the electricity to the other data center. A data center 105 in a heat island (e.g., a densely populated city with numerous structures absorbing heat throughout the day) with a lower cooling rate compared to a data center in a rural area (e.g., fewer structures to absorb heat and more open area to cool off) can transfer electric loads to the data center in the rural area. The WECS 130 is also configured to receive electric grid operating costs (e.g., the cost to generate and distribute electricity from the electric utility) through grid interactive services 120 and adjust data center 105 electric load usage, e.g., by adjusting software workloads processed at the data center which can include transferring workloads to another data center or adjusting the schedule of workloads. For example, the electric grid may generate electricity at costs that exceed allowable rates (e.g., during peak electric demand) and the WECS 130 can transmit signals to the energy services API 150 to reduce data center electric usage and ease electric loading on the electric grid, preventing imminent outages. Power curtailment schedules can be planned by the RDCCS 140 (e.g., by the resource schedule 156) to meet specified electric usage commitments provided by the grid interactive services 120, then implemented by the WECS 130 and corresponding DER controls 112-1 through 112-N.

The WECS 130 is configured to support power grid activities in the data center environment 100 (e.g., maintaining reliable power flow, address power supply and demand balances, and system recovery after blackout events). The WECS 130 enables the data center 105 to operate independently on a microgrid level and uses the agnostic interface 180 to interact with the various interfaces of DER controllers 112-1 through 112-N. The agnostic interface 180 allows the WECS 130 to execute commands from the RDCCS 140 in near-real time, and allows for the DER controllers 112-1 through 112-N to communicate to each other through the WECS 130. The agnostic interface 180 enables a plug-in feature for the data center environment 100, in which any of the DER 110-1 through 110-N can be installed, removed, or replaced and the WECS 130 monitors the corresponding electric loads from the corresponding DER controllers 112-1 through 112-N to ensure reliable power flow for data center 105. The WECS 130 performs and executes the commands with reduced latency compared to a data center environment 100 in which the DERs 110 are configured to individually coordinate with each other.

Figure 1B:
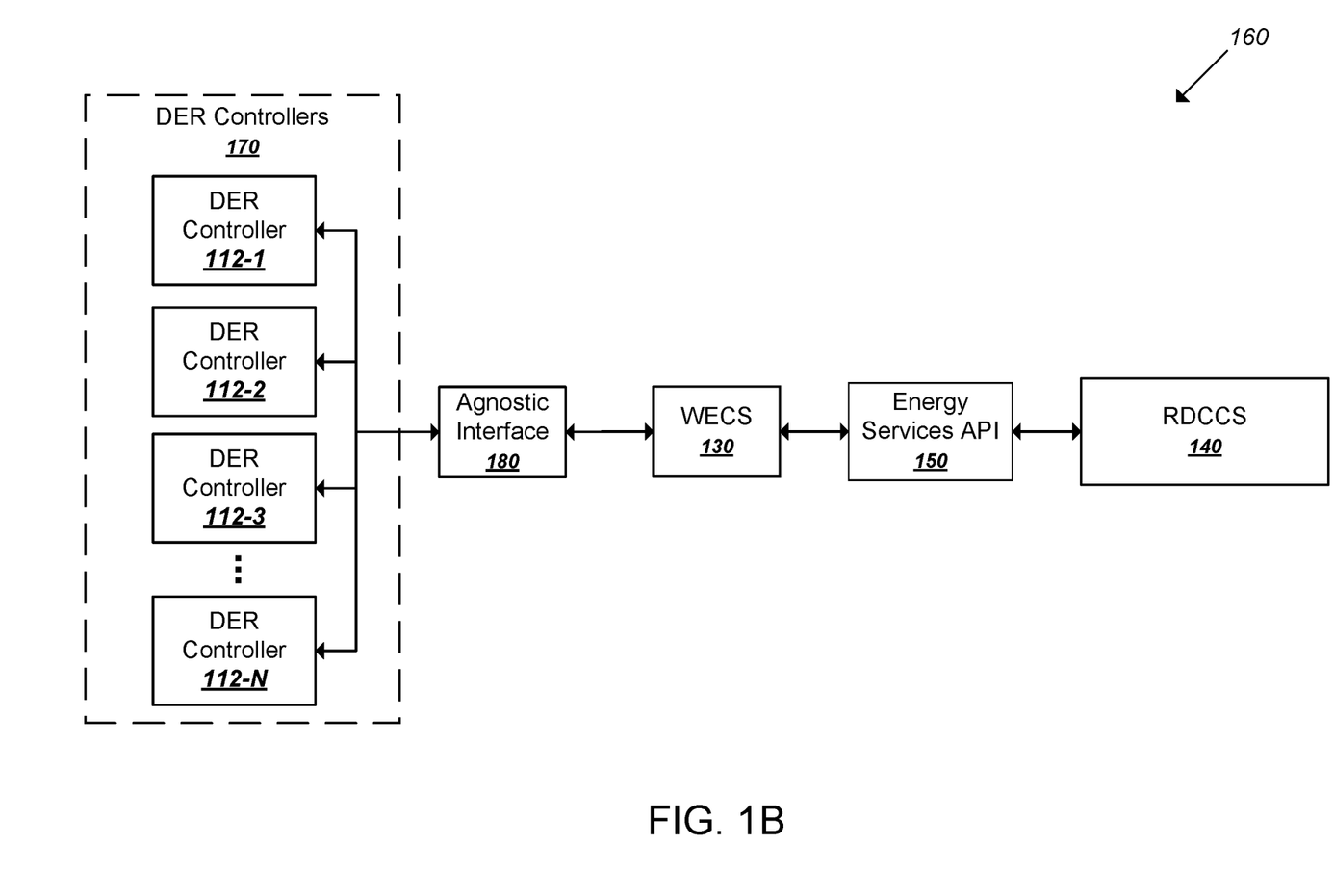
FIG. 1B depicts the interconnection between the remote data center software control system, the wide-area energy control system, and the distributed energy resource controllers of FIG. 1A.

FIG. 1B depicts an example interconnection 160 between a remote data center control system (e.g., the RDCCS 140 of FIG. 1A) to multiple distributed energy resources controllers (e.g., the controllers of the DERs 110 of FIG. 1A) using a wide-area energy control system (e.g., WECS 130 of FIG. 1A).

In the illustrated implementation, the DER controllers 170 include the DER controllers 112-1 through 112-N connected to an agnostic interface 180. Each DER controller 112-1 through 112-N of the DER controllers 170 contain a respective interface to receive power control information, in which the power control information describes the operation of the respective DER for the DER controllers 112-1 through 112-N.

The agnostic interface 180 is a hardware component that serves a consolidated interface for the WECS 130 to operate the DER controllers 170, by enabling communication via a protocol. The WECS 130 retrieves status information pertaining to DERs 110 from the DER controllers 170, including the heat rate, approximate efficiency, emissions, capacity, power quality etc. For example, the DER controller 110 of a diesel generator has an interface that describe engine properties (e.g., oil pressure, coolant temperature, revolutions per minute, etc.) and generator properties (voltage, amperage, etc.) through the interface of the DER controller. The agnostic interface 180 consolidates the engine and generator properties, along with other DER controller status information to transmit to the WECS 130. The WECS 130 receives the engine and generator properties of the diesel generator through the agnostic interface 180, then transmits the engine and generator properties to the energy services API 150. The RDCCS 140 accesses the engine and generator properties of the diesel generator and determines control information to adjust the operation of the diesel generator based on characteristics of other DERs and electric loads of a data center environment (e.g., the data center environment 100 of FIG. 1A).

In another example in which the DER is a battery storage asset, the agnostic interface 180 of the WECS 130 consolidates status information describing capacity and duration properties of the battery storage asset from the interface of the DER controller. For example, the DER controller of the battery storage asset describes rated power capacity, energy capacity, storage duration, and status of charge. The agnostic interface 180 consolidates the capacity and duration properties, along with other DER controller status information to transmit to the WECS 130. The WECS 130 receives the capacity and duration properties of the battery storage asset through the agnostic interface 180, then transmits the capacity and duration properties to the energy services API 150. The RDCCS 140 accesses the capacity and duration properties of the battery storage asset and determines control information to adjust the operation of the battery storage asset based on characteristics of other DERs and electric loads of a data center environment (e.g., the data center environment 100 of FIG. 1A).

The energy services API 150 provides an interface for the WECS 130 and RDCCS 140 to communicate control information and power control information. The RDCCS 140 may use resources (e.g., historical data 152, software services 154, resource schedule 156, and schedule improvement engine 158, referring to FIG. 1A) to determine the power control information for desired operability of the data center environment. The RDCCS 140 receives status information about the DERs 110 (referring to FIG. 1A) to determine preferred power control information, depending on operating circumstances.

The WECS 130 receives the power control information from the RDCCS 140 through the energy services API 150 and determines control information to execute multiple commands. The commands generated by the WECS 130 will adjust operating parameters of DERs 110 (referring to FIG. 1A) through respective DER controllers 170. The WECS 130 provides a connection to the DER controllers 170, through the agnostic interface 180, to allow the DER controllers to communicate with one another.

Figure 2:
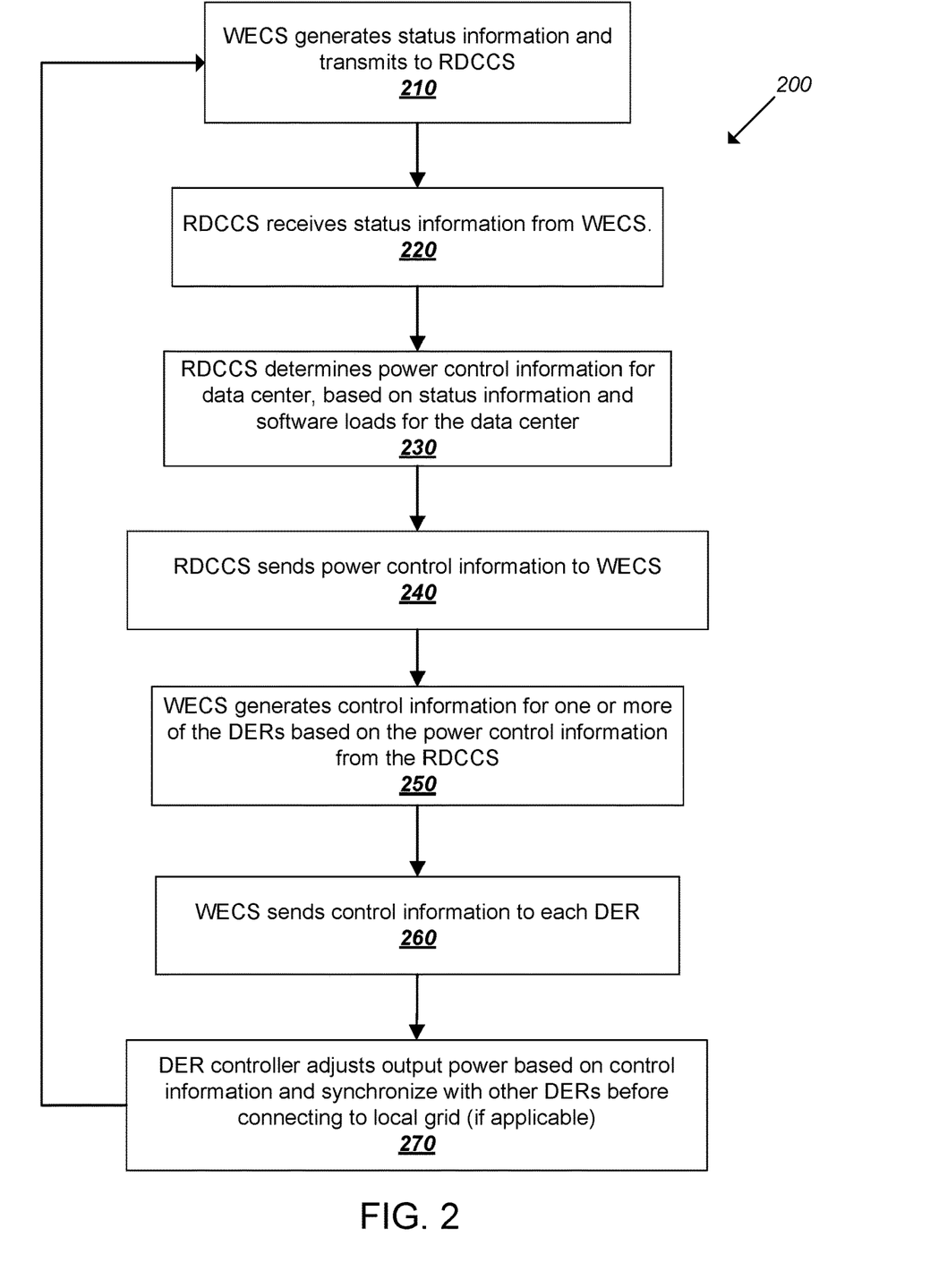
FIG. 2 depicts a flow chart of an example process for managing power for loads of a data center.

FIG. 2 is a flowchart illustrating an example process 200 of managing power for loads of a data center using a wide-area energy control system (e.g., a microgrid controller). The data center and wide-area control system can be, for example, the data center 105 and the wide-area energy control system (WECS) 130 of FIG. 1A, respectively. A control system that includes a WECS and/or a remote data center control system (e.g., the RDCCS 140 of FIG. 1A) is configured to perform the process 200, although the process 200 can also be performed by a co-located control system. In some examples, the process 200 may be performed through a communication system (e.g., wireless and wired networks) to transmit and receive information.

At 210, the WECS generates status information and transmits the status information to the RDCCS through an example network (e.g., wide-area network, local area network, etc.). The status information can be different types of data describing characteristics about various distributed energy resources (e.g., the DERs 110 of FIG. 1A) through the respective DER controller. For example, the status information from the DER controller of a diesel generator can include characteristics of its output power (e.g., line-to-line voltage, individual line-to-neutral voltage, frequency, current, phase, and/or other operation parameters of the diesel generator). The various distributed energy resources may generate and send status information using different formats depending on the vendor of the distributed energy resource. For example, one energy resource can send information using text files while another uses comma-separated values (csv) files. Each energy source can also send different types of status information, some of which is used by the WECS and/or RDCCS and some of which may not be used.

The WECS can be configured to consolidate the status information from the DER controllers of the various energy sources of the data center into a common standard format. For example, the WECS can include a data formatting engine configured to parse the various types of files for the proper information and convert the information to the standard format.

The status information received from the DERs can be time-stamped to indicate when the information was measured or obtained. Some data center level services may use status information based on a particular sampling rate and DERs may report status information at different rates. The WECS can be configured to align the time stamped data from multiple DERs that report status information at different rates so that these services can readily process the status information.

At 220, the RDCCS receives status information from the WECS. as described above, the status information can be standardized by the WECS and sent to the RDCCS using the energy services API 150. Once standardized status information is received, the RDCCS leverages resources (e.g., historical data, software services, etc.) to service the software loads of the data center. The RDCCS can use a resource schedule to prioritize load activities of the data center, depending on the standardized status information received. The RDCCS can identify an incoming change in load demand to fulfill critical software services, in which the data center resources need to be re-configured to meet the change in load demand. Re-configuring data center resources may involve advance notice in order to shift operating schedules and parameters prior to the change in load demand.

For example, the RDCCS receives load information about multiple energy sources operating in the data center and identifies an increase in load demand. If the increase in load demand is projected to occur during a time window, the RDCCS determines a schedule for the energy sources to follow and successfully meet the increase in load demand during the time window without a disruption in service. The schedule includes adjusting parameters of the energy sources to meet the increase in the load demand. The parameters include power control information for the distributed energy resources of the data center. As described above, the power control information can include the target output power for the energy sources (or for each energy source) and/or a configuration of the energy sources, e.g., which energy sources should output power to the power bus of the data center and/or the characteristics of the power to be output by each energy source, e.g., the voltage, current, phase, frequency, and/or other characteristics of the output power.

At 230, the RDCCS determines power control information for the data center, based on status information received from the WECS and/or software loads for processing by the data center. The RDCCS can determine the power control information from the status information of the data center (e.g., the software loads), historical data, software services, and the resource schedule of the RDCCS. The power control information describes desired power loads and schedules for the data center (e.g., data center 105 of FIG. 1A). The WECS can determine local configurations for corresponding DER controllers of DERs (e.g., the DERs 110 of FIG. 1A) to adjust voltage, frequency, real and reactive power, and scheduling (e.g., start/stop time).

For example, the RDCCS can determine the power control information for DERs operating at the data center to meet a forecasted increase in software workload demand at the data center. The RDCCS, through the use of historical data, the resource schedule, and/or the schedule optimization engine, determines the power load and operating schedule that the DERs are to operate. The RDCCS calculates the desired operating loads for the DERs and detailed schedules to satisfy the forecasted increase in load demand.

At 240, RDCCS sends power control information to WECS through the example network. The WECS is configured to receive power control information describing, for example, which DERs need to be adjusted, the level of load adjustment that needs to be performed, and the schedule for the DERs operation to meet the RDCCS forecast. The WECS computes parameters and commands describing control information to adjust the loads in the data center environment. The WECS contains an agnostic interface 180 to communicate with the DER controllers of the DERs in near-real time and generate the control information for the respective DER controller. As an example, the RDCCS may determine power control information for the data center to be executed at a later instance (e.g., a specified time and day) after the WECS receives the power control information.

For example, the WECS receives power control information to increase the demanded loads from diesel generators and increase the charging capacity of other DERs (e.g., battery assets) over a period of one day. The WECS can identify the operating parameters (e.g., voltages and frequencies) for the respective DER from the power control information, including updates to the timing and scheduling for the respective DER. The WECS can identify a start and stop time to ramp-up electricity production from diesel generators and the control parameters (e.g., revolutions per minute) necessary to perform the ramp-up. In some examples, the WECS is constantly receiving power control information from the RDCCS for data center operations during critical grid operations (e.g., maintenance, unplanned outages).

At 250, the WECS generates control information for one or more of the DERs based on the power control information. The WECS generates commands through an agnostic interface to implement the updates of the identified parameters by the RDCCS. The WECS generates commands in near-real time and communicates to the corresponding DER through the respective DER controllers. The agnostic interface and monitoring of the WECS allows the WECS to create and execute commands in near-real time, while the RDCCS can provide constant power control information in some examples. As an example, the WECS may generate commands through the agnostic interface to be executed at a later instance (e.g., a specified time and day) after the WECS receives the power control information or generates the control information.

For example, the WECS can generate executable commands for a diesel generator controller to increase voltage and revolutions per minute of the diesel generators during a time window of one day or provide reference commands to increase the power output from the storage generation assets such that all participating DERs equally share the data center load. The WECS can generate the executable commands based on the values for voltage and schedule determined by the RDCCS, in a format that is accepted by the DER controller (e.g., diesel generator control panel) of the respective DER. As described above, the DER controller and the WECS can communicate using respective standard agnostic interfaces that involve a standard communication protocol. The WECS may also generate additional commands to decrease the usage of additional DERs e.g., battery assets by slowly shifting loads to other DERs and increasing the charging rate of the battery assets.

At 260, the WECS transmits control information to each DER through its respective DER controller and the agnostic interface. The WECS transmits the generated commands of 250 to configure the DER controllers to the updated identified parameters from the RDCCS. The WECS transmits the commands in near-real time and communicates to the DER controller. In some examples, the WECS transmits commands at a specified time and day, e.g., by a schedule which may be determined by the RDCCS.

For example, the WECS transmits the executable commands for the diesel generator controls (e.g., diesel generator control panel) to increase voltage and revolutions per minute of the diesel generators during a time window of one day. The WECS transmits the calculated values for voltage and schedule to meet the increase in load demand determined by the RDCCS. The WECS may also transmit additional commands impacted the usage and operation of other DERs. In some examples, the WECS transmits a command to synchronize the respective DER controller with one or more DER controllers to synchronize the DER with one or more DERs prior to connecting to the microgrid.

At 270, the respective DER controller adjusts output power based on control information transmitted via commands generated by the WECS. The respective DER controller receives a command or multiple commands to update corresponding values related to the DER operation. The respective DER controller may also receive a command to synchronize with other DER controllers, and adjust the executed timing of the respective DER. The respective DER controller may receive a command or operating profile with multiple commands from the WECS to adjust the executed timing of the respective DER at some time in the future (e.g., hours, days, weeks) after receiving the command or operating profile.

For example, the respective DER controller (e.g., diesel generator control panel) executes the received command from the WECS to adjust the voltage and revolutions per minute of the connected diesel generator. The diesel generator control panel adjusts the parameters of the diesel generator and configures the diesel generator to operate according to the control information calculated and transmitted from the WECS. The DER controller of the diesel generator may synchronize with other DER controllers of battery assets to coordinate a ramp-up of diesel power loads and a ramp-down of battery asset loads.

Optionally, while the WECS transmits control information to each DER, the method can also generate new status information and transmit to the RDCCS. In response to receiving the new status information, the RDCSS can re-determine and re-transmit power control information for the WECS to re-generate and re-transmit new control information for each DER.

Figure 3:
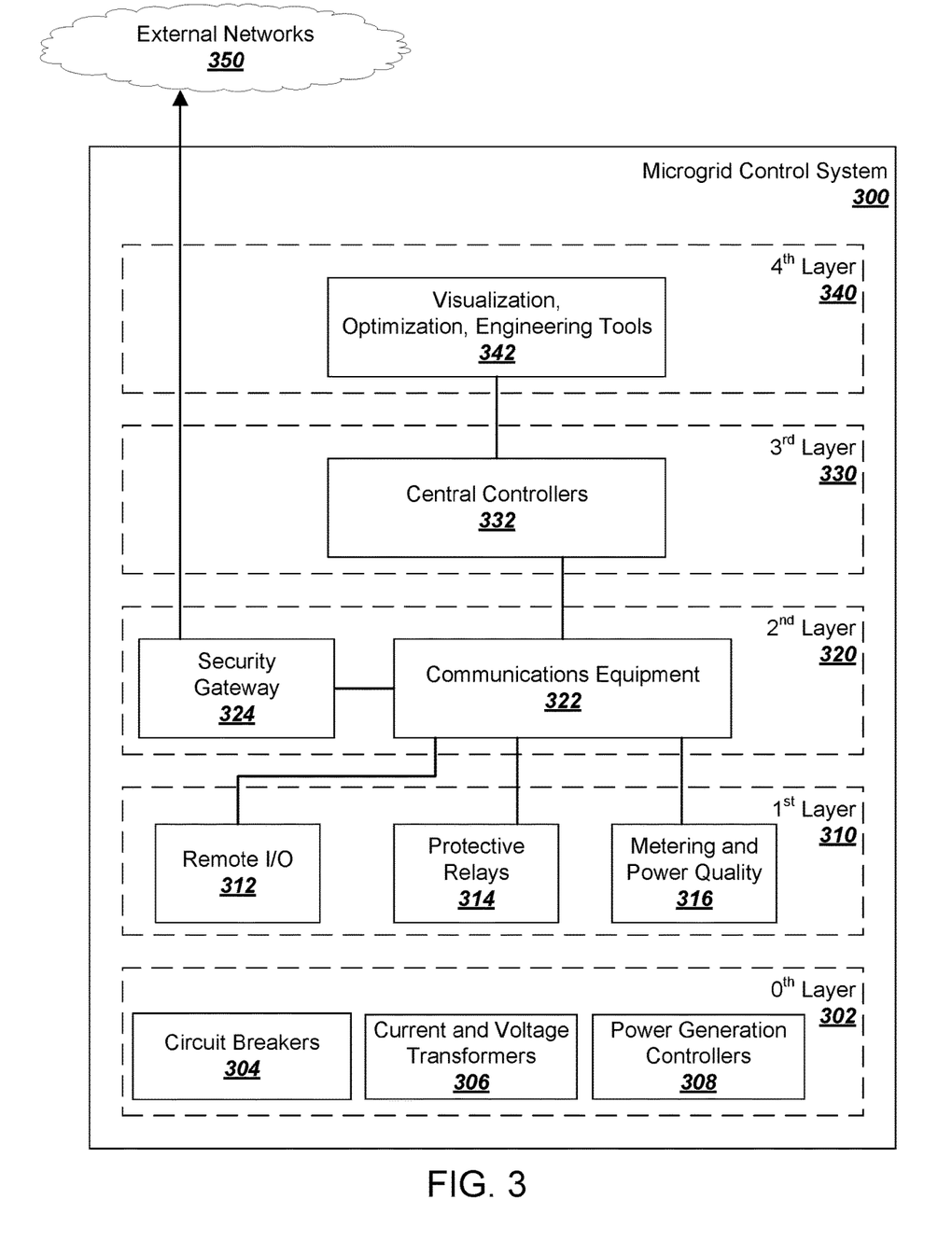
FIG. 3 depicts an example wide-area energy control system architecture.

FIG. 3 depicts an example multi-layer architecture pattern of a data center control system 300 with the zeroth, first, second, third, and fourth layers, in which each layer performs an associated function of the data center control system architecture. Each layer of the microgrid control system 300 may include equipment to perform the respective associated function of the microgrid control system architecture. Equipment failure in each layer does not impact the functionality of equipment in a lower layer of the microgrid control system 300.

The zeroth layer 302 contains example electrical equipment within the microgrid including circuit breakers 304, current and voltage transformers 306, and power generation controllers 308. The circuit breakers 304, current/voltage transformers 306, and power generation controllers 308 can be supplemented with additional equipment not shown in FIG. 3, including transmission lines and generators. The circuit breakers 302 are configured to interrupt current flow in case of a fault in the microgrid. The current and voltage transformers 306 are configured to step down the current or voltage received by the microgrid from a power supply (e.g., distributed energy resource 110 of FIG. 1A). The power generation controllers 308 are configured to regulate and control devices from a power supply (e.g., distributed energy resource 110 of FIG. 1A) for the microgrid. Referring to FIG. 1A, the distributed energy resources 110 illustrate the functionality of the zeroth layer 302.

The first layer 310 includes a remote I/O 312, protective relays 314, and metering and power quality tools 316 to monitor and control the electrical equipment in the zeroth layer 302 of the microgrid. In some examples, the monitoring tools are connected via hardwire but can also perform digital status and controls of the equipment through a wireless connection (e.g., Internet, Bluetooth). The remote I/O 312 provides data collection and facilitates controls of equipment in the zeroth layer 302 (e.g., power generation controllers 308). The protective relays 314 is configured to detects faults in the microgrid and enable circuit breakers 304 in the zeroth layer 302 to prevent or minimize damage to equipment. The metering and power quality tools 316 are configured to provide diagnostic information about the microgrid (e.g., sequence of event records, oscillography recordings). An advantage of monitoring and preventing damage to equipment greatly reduces microgrid downtown and extends the lifetime of expensive equipment (e.g., transformers, generators). Referring to FIGS. 1A and 1B, the first layer 310 is not illustrated.

The second layer 320 includes at least one or more communications equipment 322 and a security gateway 324. The communications equipment 322 obtains data from equipment in the first layer 310 (e.g., remote I/O 312, protective relays 314, metering and power quality 316) and aggregates the data to be transmitted to the third layer 330. Referring to FIG. 1B, the agnostic interface 180 illustrates the functionality of the second layer 320.

The third layer 330 includes central controllers 332 to provide control functions requiring status information from one or more devices in the first layer 310 (e.g., the protective relays 314). The central controllers 332 receive status information from devices in the first layer 310 to determine and transmit commands affecting the operation of the microgrid. For example, the central controllers 332 can transmit commands to perform functions including power factor control, energy source dispatch, load shedding, volt-var management, and frequency control. Referring to FIGS. 1A and 1B, the WEC system 130 illustrates the functionality of the third layer 330.

The fourth layer 340 includes visualization, optimization, and engineering tools 342 to analyze the microgrid. The visualization, optimization, and engineering tools 342 include applications to perform peak shaving, load shifting, power capping, system optimization, monitoring, and other types of microgrid tasks. The applications performed by the fourth layer 340 can improve the efficiency of the microgrid control system 300 through various states and transitions of the microgrid (further illustrated in FIG. 4). Referring to FIGS. 1A and 1B, the RDCC system 140 illustrates the functionality of the fourth layer 340.

Figure 4:
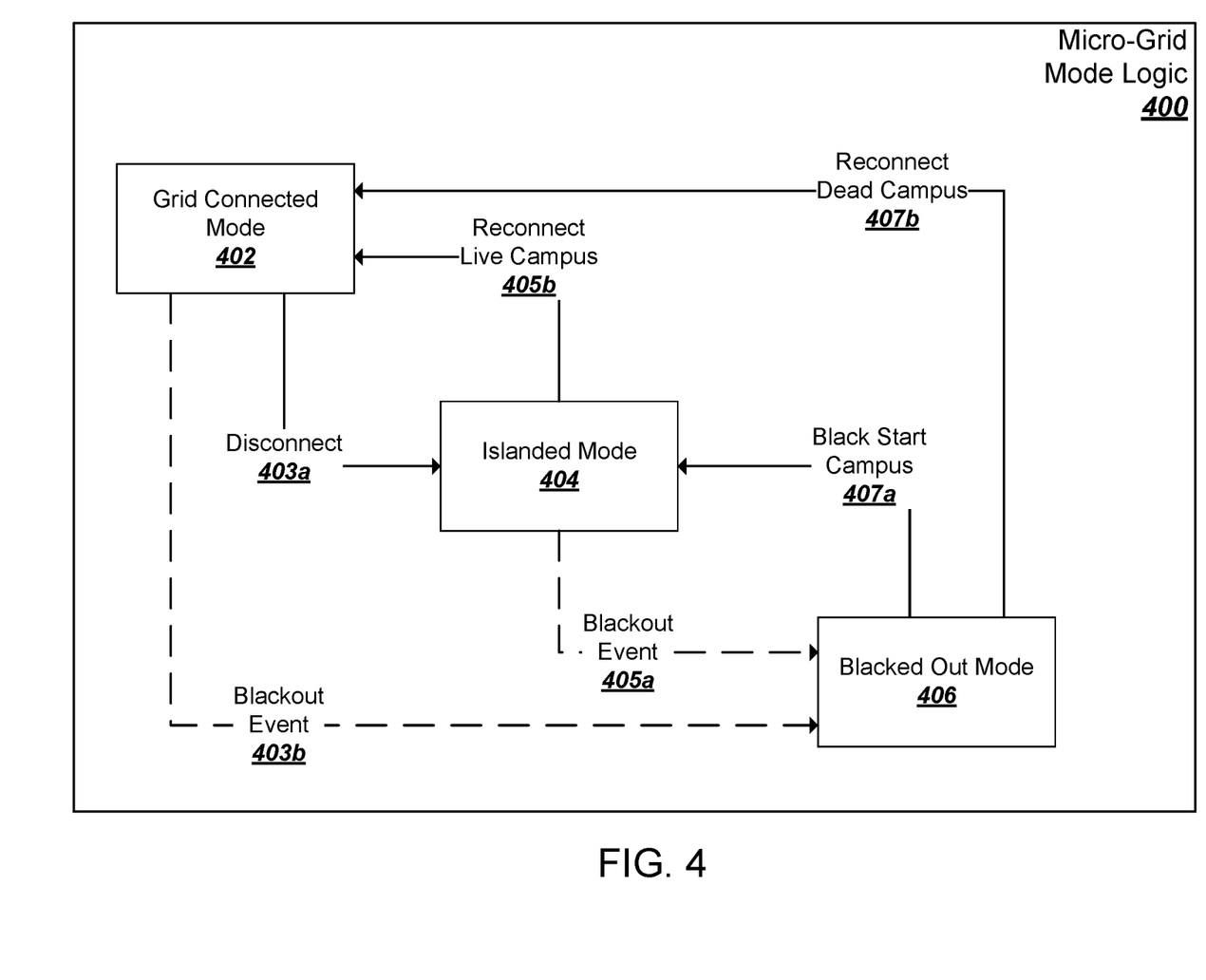
FIG. 4 depicts example states and transitions of a data center microgrid.

FIG. 4 is a schematic diagram of example micro-grid mode logic 400 with example states and transitions of a data center environment (e.g., data center environment 100 of FIG. 1A) to operate an example data center (e.g., data center 105 of FIG. 1A). The micro-grid mode logic 400 can be executed by a wide-area energy control system (e.g., WECS 130 of FIG. 1A) to operate the data center environment through different operating modes.

The WECS executes managed and unmanaged transitions between the different operating modes of the data center environment. The managed transitions describe a desired transition (e.g., planned or routine maintenance, independent microgrid operation from power grid) between operating modes. The unmanaged transitions describe an undesired transition between operating modes (e.g., damage to transmission equipment, human error, and overloaded power grid) that may include a blackout event (e.g., power outage). The transitions include disconnecting from an electric utility, reconnecting the live data center, reconnecting the dead data center, and initiating a black start for the data center. The transitions executed by the WECS will be further described below.

An example operation mode for the data center environment (e.g., data center environment 100 of FIG. 1A) is a grid connected mode 402 executed by a wide-area energy control system (e.g., WECS 130 of FIG. 1A), in which the data center environment is operating under normal circumstances. The grid connected mode 402 includes connecting the data center environment with an electric utility using utility feeders through at least one or more points of common coupling (e.g., two points of common coupling). The data center environment operating in grid connected mode 402 includes main battery energy storage system (BESS) assets to maintain active power flow, reactive flow, power factor, at each point of common coupling. Backup power sources (e.g., diesel generators) are available, but typically configured to be inactive while the data center environment operates in the grid connected mode 402.

When the data center environment operates in grid connected mode 402, the WECS can perform a managed transition through disconnect 403a to operate in an islanded mode 404. For example, the data center environment operates in the islanded mode 404 if the electric utility experiences damage to critical power equipment (e.g., pole-type or network transformers, network protectors) due to natural disasters (e.g., hurricanes, tornadoes, floods) and allows the data center environment to continue providing services (e.g., software services 154 referring to FIG. 1A) without disruption. The data center environment also operates in the islanded mode 404 if the electric utility performs planned routine maintenance of critical power equipment (e.g., replacing corroded transformers) to minimize disruption in providing services.

In the islanded mode 404, the backup power sources are configured to be active for the data center environment and the main BESS assets are configured to maintain a minimum active power reserve for the backup power sources. The WECS disconnects the data center environment from the electric utility to operate independently using the main BESS assets and backup power sources. The main BESS assets are also configured to maintain voltage for switchgear devices, in which the switchgear devices are configured to control, protect, and isolate electric equipment in a data center environment. The WECS can perform a managed transition of the data center environment to the grid connected mode 402 through reconnect live campus 405b, which reconnects the data center environment to the electric utility to maintain nominal operating conditions.

The WECS performs an unmanaged transition of the data center environment from operating in the islanded mode 404 through a blackout event 405a to operate in a blacked out mode 406. In an example, the data center environment operating in the blacked out mode 406 may experience a severe or complete disruption in providing services. If the data center environment operates in the blacked out mode 406, the WECS is configured to attempt to use distributed energy resources (DERs 110, referring to 110-1-110-n of FIG. 1A) in conjunction with the backup generators to return to the data center environment to the islanded mode 404 or the grid connected mode 402. The DER may include additional BESS assets, super-capacitors, or diesel generators. In some examples, the WECS is configured to use the DER for the data center environment operating in the blacked out mode 406 to provide service (e.g., provide supply to the demanded loads) while addressing the cause of the unmanaged transition (e.g., blackout event 403b or 405a).

The WECS performs a managed transition of the data center environment from operating in the blacked out mode 406 to operate in the islanded mode 404 though a black start campus 407a. The black start campus 407a is a managed transition in which the WECS is configured to power the data center environment using DER (e.g., additional BESS assets, diesel generators), to further power equipment used in the islanded mode 404 (e.g., main BESS assets or main diesel generators). If the equipment in the islanded mode 404 is successfully powered, then the WECS can transition the data center environment to the islanded mode 404.

In some examples, the WECS performs a managed transition of the data center environment from operating in the blacked out mode 406 to operate in the grid connected mode 402 through a reconnect dead campus 407b. The reconnect dead campus 407b is a managed transition in which the WECS is configured to power the data center environment using the electric utility, to further power the main BESS assets and allow the data center environment to transition to the grid connected mode 402 under nominal operating conditions.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device, such as a CRT (cathode ray tube) or LCD (liquid crystal display) monitor for displaying information to the user and a keyboard and a pointing device, such as a mouse or a trackball by which the user can provide input to the computer. Additionally, such activities can be implemented via touchscreen flat-panel displays and other appropriate mechanisms.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Further to the descriptions above, a user may be provided with controls allowing the user to make an election as to both if and when systems, programs, or features described herein may enable collection of user information. In addition, certain data may be treated in one or more ways before it is stored or used, so that personally identifiable information is removed. For example, a user's identity may be treated so that no personally identifiable information can be determined for the user, or a user's skin data and/or diagnosis cannot be identified as being associated with the user. Thus, the user may have control over what information is collected about the user and how that information is used.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The foregoing description is provided in the context of one or more particular implementations. Various modifications, alterations, and permutations of the disclosed implementations can be made without departing from scope of the disclosure. Thus, the present disclosure is not intended to be limited only to the described or illustrated implementations, but is to be accorded the widest scope consistent with the principles and features disclosed herein.

Although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

The invention claimed is:

1. A system for managing power for loads of a data center, the system comprising:
a set of local energy sources configured to provide power to the loads of the data center, each local energy source comprising a local controller configured to adjust operation of the local energy source, each local controller comprising a local interface configured to communicate with other interfaces using a communication protocol, wherein the communication protocol of at least one local interface is different from the communication protocol of one or more other local interfaces; and
a wide-area energy controller comprising:
a first interface communicatively coupled to an application programming interface (API) that connects a remote data center control system to respective wide-area energy controllers of multiple data centers, the first interface being configured to receive power control information based on aggregated status information from the remote data center control system via the API, wherein the remote data center control system generates the aggregated status information from status information across multiple local energy sources from the set of local energy sources, the aggregated status information representing a status of the multiple local energy sources;
a control unit configured to generate respective control information for each of the local energy sources based on the received power control information; and
a second interface communicatively coupled to the local interface of each local controller of each local energy source in the set of local energy sources, wherein the second interface is configured to generate, for each local energy source, a respective set of commands to adjust operation of the local energy source based on the respective control information and according to the communication protocol used by the local interface of the local controller, wherein the second interface sends the respective set of commands to the local interface of each local controller.

2. The system of claim 1, wherein the set of local energy sources comprise at least two or more different types of energy sources.

3. The system of claim 2, wherein the set of local energy sources include two or more of (i) a diesel generator, (ii) a solar energy source, (iii) a wind energy source, or (iv) a battery energy source.

4. The system of claim 1, wherein the loads comprise a plurality of data center computers and networking equipment.

5. The system of claim 4, wherein the power control information comprises a schedule of computing tasks to be performed by the data center computers.

6. The system of claim 4, wherein the power control information comprises expected power demands of computing tasks to be performed by the data center computers.

7. The system of claim 1, wherein the remote data center control system schedules computing tasks for each data center.

8. The system of claim 7, wherein a schedule of computing tasks computed for each data center is determined by a schedule optimization engine.

9. The system of claim 8, wherein the schedule optimization engine applies a plurality of historical data and a plurality of software services to improve the schedule.

10. The system of claim 1, wherein the first interface of the wide-area energy controller is agnostic to the remote data center control system.

11. The system of claim 1, wherein the second interface of the wide-area energy controller is agnostic to the local controller of each local energy source of the set of local energy sources in the data center.

12. The system of claim 1, wherein the local interface is configured to obtain external information for a particular data center of the multiple data centers, and wherein the control unit is configured to generate respective control information of each of the set of local energy sources based on the external information, the external information indicating external conditions of the particular data center having an impact on providing power to loads of the particular data center.

13. The system of claim 12, wherein the external information comprises at least one of (i) weather data, (ii) carbon emissions data, or (iii) electric grid data, for the data center from the multiple data centers.

14. A method for managing power for loads of a data center, the method comprising:
- receiving, by a wide-area energy controller of the data center and from each local energy source of a set of local energy sources configured to provide power to the loads of the data center, status information indicating a status of the local energy source, each local energy source comprising a local controller configured to adjust operation of the local energy source, each local controller comprising a local interface configured to communicate with other interfaces using a communication protocol, wherein the communication protocol of at least one local interface is different from the communication protocol of one or more other local interfaces;
- receiving, by a first interface of the wide-area energy controller communicatively coupled to an application programming interface (API), power control information based on aggregated status information from a remote data center control system via the API, wherein the API connects the remote data center control system to respective wide-area energy controllers of multiple data centers, wherein the remote data center control system generates the aggregated status information from status information across multiple local energy sources from the set of local energy sources, the aggregated status information representing a status of the multiple local energy sources;
- generating, by a control unit of the wide-area energy controller, respective control information for each of the local energy sources to provide power to the loads based on the received power control information;
- generating, by a second interface of the wide-area energy controller and for each local energy source, a respective set of commands to adjust operation of the local energy source based on the respective control information and according to the communication protocol used by the local interface of the local controller, wherein the second interface is communicatively coupled to the local interface of each local controller of each local energy source in the set of local energy sources; and
- sending, by the second interface of the wide-area energy controller, the respective set of commands to the local interface of each local controller.

15. The method of claim 14, wherein the set of local energy sources comprise at least two or more different types of energy sources, the set of local energy sources including two or more of (i) a diesel generator, (ii) a solar energy source, (iii) a wind energy source, or (iv) a battery energy source.

16. The method of claim 14, wherein the loads comprise a plurality of data center computers and networking equipment.

17. The method of claim 16, wherein the power control information comprises a schedule of computing tasks to be performed by the data center computers.

18. The method of claim 16, wherein the power control information comprises expected power demands of computing tasks to be performed by the data center computers.

19. The method of claim 14, wherein the remote data center control system schedules computing tasks for each data center.

20. The method of claim 14, wherein the first interface of the wide-area energy controller is agnostic to the remote data center control system.

21. The method of claim 14, wherein the second interface of the wide-area energy controller is agnostic to the local controller of each local energy source of the set of local energy sources in the data centers.

* * * * *